(No Model.)
G. W. ADAMS.
COFFEE OR TEA POT.
No. 401,919. Patented Apr. 23, 1889.
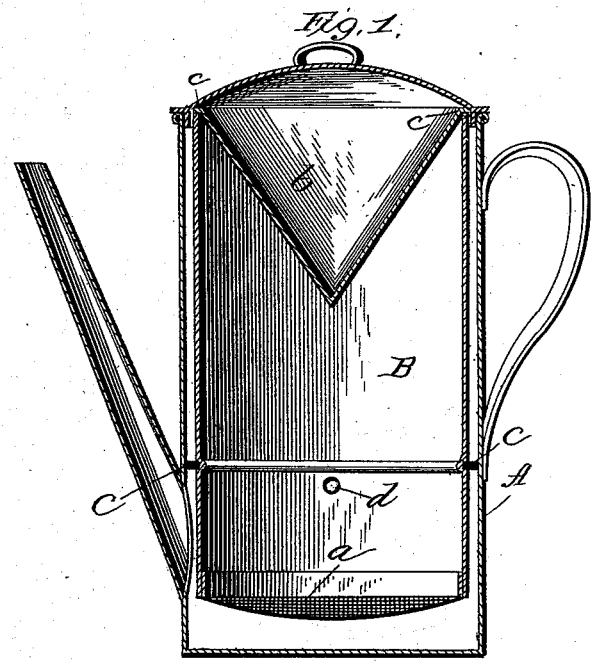
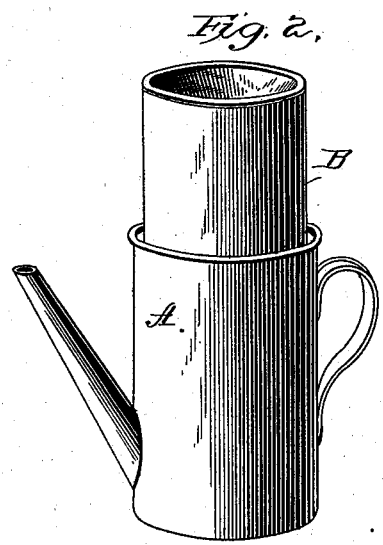

UNITED STATES PATENT OFFICE.

GALE W. ADAMS, OF CANDOR, NEW YORK, ASSIGNOR OF ONE-HALF TO FRANK J. NORTON, OF SAME PLACE.

COFFEE OR TEA POT.

SPECIFICATION forming part of Letters Patent No. 401,919, dated April 23, 1889.

Application filed February 5, 1889. Serial No. 298,738. (No model.)

*To all whom it may concern:*

Be it known that I, GALE W. ADAMS, of Candor, in the county of Tioga and State of New York, have invented a new and useful Improvement in Coffee or Tea Pots; and I do hereby declare that the following is a full, clear, and exact description of the same.

My invention relates to coffee or tea pots; and its object, principally, is to provide a simple construction of pot by means of which the aroma of the coffee or tea may be retained and the full substance of the stimulant secured.

The invention consists of a coffee-pot of ordinary construction provided with an inner cylinder having a gasket around its outer periphery, thus making a steam-tight connection between it and the wall of the coffee-pot, said cylinder being adapted to hold the coffee or tea, and having a steam-tight cap provided with a suitable filling adapted to condense the steam which impinges against it.

In the accompanying drawings, Figure 1 represents a vertical sectional view of a coffee-pot, with the interior cylinder in place, also in section. Fig. 2 is a detail view of the cylinder in side elevation.

In the drawings, A represents the coffee-pot, which is of ordinary construction, and may be of any suitable size and composed of any suitable material. Within this coffee-pot I arrange a cylinder, B, which is of slightly less diameter than the diameter of the coffee-pot, and I place a gasket, C, around the cylinder, which causes it to fit the walls of the coffee-pot snugly and makes the space between the walls of the pot and cylinder and below the gasket a steam-space from which the steam cannot escape, the packing making the space steam-tight. The gasket may be of any suitable material which will serve as a packing to prevent the escape of steam, but at the same time allow the cylinder to move within the coffee-pot. The coffee or other material is held within the cylinder B, which has a perforated bottom, *a*, and this bottom may be detachable, being formed separate, or it may be permanently connected and be composed of gauze or anything which may serve to hold the material and serve to act as a strainer.

In the upper part of the cylinder a cone-shaped receptacle, *b*, is placed, having flanges *c*, which allow it to rest upon the upper edge of the cylinder, and over this is placed a cover which has overlapping flanges, forming the cover for the whole pot. The tapering walls of the receptacle *b*, extending down into the cylinder, form a surface upon which the steam condenses and falls back into the water within the pot. If desired, any suitable material may be placed within the receptacle *b* to aid in the condensation of the steam.

It will thus be seen that when the coffee is placed in the bottom of the cylinder B, water having been poured into the coffee-pot, the steam generated is below the line of the packing, the cylinder being raised according to the amount of water which is put within the pot, so as to at all times have the packing above the water-line. There is no escape of the aroma or strength of the coffee, as the opening to the mouth or spout of the pot is beneath the water-line and the steam can only rise in the interior of the cylinder, where it condenses against the walls thereof and the walls of the receptacle *b*, falling back in the shape of water into the pot. In case, however, the steam-pressure should become excessive, I have provided an opening, *d*, just below the line of the packing in the cylinder, this acting as a safety-vent, and the steam passing through this opening fills the chamber above the water-line between the walls of the cylinder and the coffee-pot, and the steam-pressure, acting upon the packing which forms the top of this steam-chamber, will move the cylinder upwardly, thus enlarging the chamber and preventing all danger of explosion. The packing may be held in place by a suitable indentation or rib formed around the cylinder.

I claim as my invention—

1. In a coffee or tea pot, an interior cylinder, B, of slightly less diameter than the diameter of the pot, with a packing-ring connected with the said cylinder B, and a vent through the wall of the said cylinder below the line of the packing, substantially as described.

2. In a coffee or tea pot, an interior cylinder, B, a packing-ring on the outer circumference of said cylinder, forming a steam-tight chamber below the same between the walls of the cylinder and the coffee-pot, and a condenser in the top of said cylinder, substantially as described.

3. In combination with a coffee or tea pot, a cylinder, B, having a perforated bottom, a packing-ring around the outer circumference thereof, a safety-vent through the wall of the cylinder below the packing-ring, a condenser in the top of said cylinder, and a cover, substantially as described.

In testimony whereof I have signed my name to this specification in the presence of two subscribing witnesses.

GALE W. ADAMS.

Witnesses:
CHARLES O. HENLEY,
GURLEY D. WILLSEY.